United States Patent
Koo

(10) Patent No.: US 8,509,108 B2
(45) Date of Patent: Aug. 13, 2013

(54) APPARATUS AND METHOD FOR DETECTING VOICE PERIOD IN MOBILE COMMUNICATION SYSTEM

(75) Inventor: Ja-Yong Koo, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 240 days.

(21) Appl. No.: 13/033,013

(22) Filed: Feb. 23, 2011

(65) Prior Publication Data

US 2011/0216663 A1 Sep. 8, 2011

(30) Foreign Application Priority Data

Mar. 2, 2010 (KR) .................. 10-2010-0018380

(51) Int. Cl.
*H04B 14/06* (2006.01)
(52) U.S. Cl.
USPC .......................................... 370/252

(58) Field of Classification Search
USPC .. 370/252, 335, 342, 352–356, 395.5–395.52
See application file for complete search history.

(56) References Cited

U.S. PATENT DOCUMENTS

| | | | | |
|---|---|---|---|---|
| 7,706,262 B2 * | 4/2010 | Link et al. | | 370/230 |
| 2005/0152341 A1 * | 7/2005 | Curcio et al. | | 370/352 |
| 2011/0306309 A1 * | 12/2011 | Yabe | | 455/72 |

* cited by examiner

*Primary Examiner* — Frank Duong
(74) *Attorney, Agent, or Firm* — Jefferson IP Law, LLP

(57) ABSTRACT

An apparatus and method for detecting a voice period in a mobile communication system are provided. The method includes determining a voice codec rate, comparing a maximum size of a Silence InDication (SID) packet and a minimum size of a voice packet corresponding to the determined voice codec rate, and detecting the voice period by using any one of a packet size and an inter-packet interval according to the comparison result.

16 Claims, 5 Drawing Sheets

| STATUS | ROHC HEADER [bits] | VoIP FRAME [bits] | TOTAL (MIN) [bits] | TOTAL (MAX) [bits] | DETECTION SCHEME | THRESHOLD [bits] |
|---|---|---|---|---|---|---|
| AMR 4.75kbps | 24~120 | 107 | 131 | 227 | INTER-PACKET INTERVAL | 90(ms) |
| AMR 5.15kbps | 24~120 | 115 | 139 | 235 | INTER-PACKET INTERVAL | 90(ms) |
| AMR 5.90kbps | 24~120 | 130 | 154 | 250 | INTER-PACKET INTERVAL | 90(ms) |
| AMR 6.70kbps | 24~120 | 146 | 170 | 266 | INTER-PACKET INTERVAL | 90(ms) |
| AMR 7.40kbps | 24~120 | 160 | 184 | 280 | PACKET SIZE | 184(ms) |
| AMR 7.95kbps | 24~120 | 171 | 195 | 291 | PACKET SIZE | 195(ms) |
| AMR 10.2kbps | 24~120 | 216 | 240 | 336 | PACKET SIZE | 240(ms) |
| AMR 12.2kbps | 24~120 | 256 | 280 | 376 | PACKET SIZE | 280(ms) |
| SID | 24~120 | 56 | 80 | 176 | | |

FIG.3

APPARATUS AND METHOD FOR DETECTING VOICE PERIOD IN MOBILE COMMUNICATION SYSTEM

PRIORITY

This application claims the benefit under 35 U.S.C. §119 (a) of a Korean patent application filed in the Korean Intellectual Property Office on Mar. 2, 2010 and assigned Serial No. 10-2010-0018380, the entire disclosure of which is hereby incorporated by reference.

BACKGROUND OF THE INVENTION

1. Field of the Invention

The present invention relates to an apparatus and method for detecting a voice period in a mobile communication system. More particularly, the present invention relates to an apparatus and method for detecting a talk spurts period and a silent period in a Voice over Internet Protocol (VoIP) session.

2. Description of the Related Art

Recently, there is ongoing discussion on implementation of a Voice over Internet Protocol (VoIP) service in a mobile communication system. The VoIP service has a unique characteristic of statistical multiplexing that is based on a small packet size, a link adaptation, and an ON-OFF period. The statistical multiplexing is possible since the VoIP service has a session in which a talk spurts period and a silent period are repeated alternately. The statistical multiplexing can be achieved by allocating or releasing resources according to the talk spurts period and the silent period.

FIG. 1 illustrates a talk spurts period and a silent period in a VoIP session according to the related art.

Referring to FIG. 1, a talk spurts period 100 for generating a voice packet and a silent period 110 for not generating a voice packet are repeated alternately in the VoIP session. More particularly, the voice packet is generated every 20 milliseconds (ms) in the talk spurts period 100, and a Silence InDication (SID) packet for indicating the silence period is generated every 160 ms in the silent period 110. Since the SID packet is smaller in size than the voice packet, a method of detecting the talk spurts period and the silent period by using the sizes of the voice packet and the SID packet has been used in the related art.

A packet of the VoIP service has a relatively large header size in comparison with a payload, and thus a header compression scheme called RObust Header Compression (ROHC) is adopted in a Long Term Evolution (LTE) system for the effective use of bandwidth. The ROHC scheme changes a header compression rate according to call quality, and consequently changes a packet size. Therefore, there is a problem in that an LTE system that employs the ROHC scheme has difficulty in applying the related art method of detecting the talk spurts period and the silent period by using the sizes of the voice packet and the SID packet. In addition, a method of adaptively changing a source codec rate according to system complexity for the effective use of a bandwidth has recently being discussed, and it is expected that this method will result in more significant changes in the packet size.

In general, a resource is allocated in the talk spurts period and the allocated resource is released in the silent period. Therefore, incorrect detection of the talk spurts period and the silent period results in an unnecessary waste of resources or an increase in a packet delay time, thereby deteriorating call quality.

Accordingly, there is a need for a method of correctly detecting the talk spurts period and the silent period even in an environment where a size of the VoIP packet variably changes.

SUMMARY OF THE INVENTION

An aspect of the present invention is to address at least the above-mentioned problems and/or disadvantages and to provide at least the advantages described below. Accordingly, an aspect of the present invention is to provide an apparatus and method for detecting a talk spurts period and a silent period in a Voice over Internet Protocol (VoIP) session.

Another aspect of the present invention is to provide an apparatus and method for adaptively changing a mechanism of detecting a talk spurts period and a silent period by using a minimum size of a voice packet based on a voice codec rate and a maximum size of a Silence InDication (SID) packet in a VoIP session.

Another aspect of the present invention is to provide an apparatus and method for detecting a talk spurts period and a silent period on the basis of a packet size or an inter-packet interval by using a minimum size of a voice packet based on a voice codec rate and a maximum size of an SID packet in a VoIP session.

In accordance with an aspect of the present invention, a method of detecting a voice period of a base station in a mobile communication system is provided. The method includes determining a voice codec rate, comparing a maximum size of an SID packet and a minimum size of a voice packet corresponding to the determined voice codec rate, and detecting the voice period by using at least one of a packet size and an inter-packet interval according to the comparison result.

In accordance with another aspect of the present invention, a base station apparatus for detecting a voice period in a mobile communication system is provided. The apparatus includes a scheduler for determining a voice codec rate, for comparing a maximum size of an SID packet and a minimum size of a voice packet corresponding to the determined voice codec rate, and for detecting the voice period by using at least one of a packet size and an inter-packet interval according to the comparison result.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 3 illustrates a table for selecting a talk spurts period/silent period detection scheme according to an exemplary embodiment of the present invention;

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention described below relate to an apparatus and method of detecting a talk spurts period and a silent period in a Voice over Internet Protocol (VoIP) session.

Figure 1:
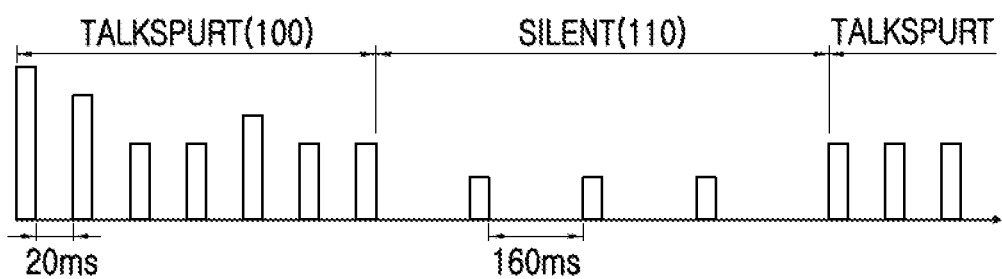
FIG. 1 illustrates a talk spurts period and a silent period in a Voice over Internet Protocol (VoIP) session according to the related art.
Figure 2:
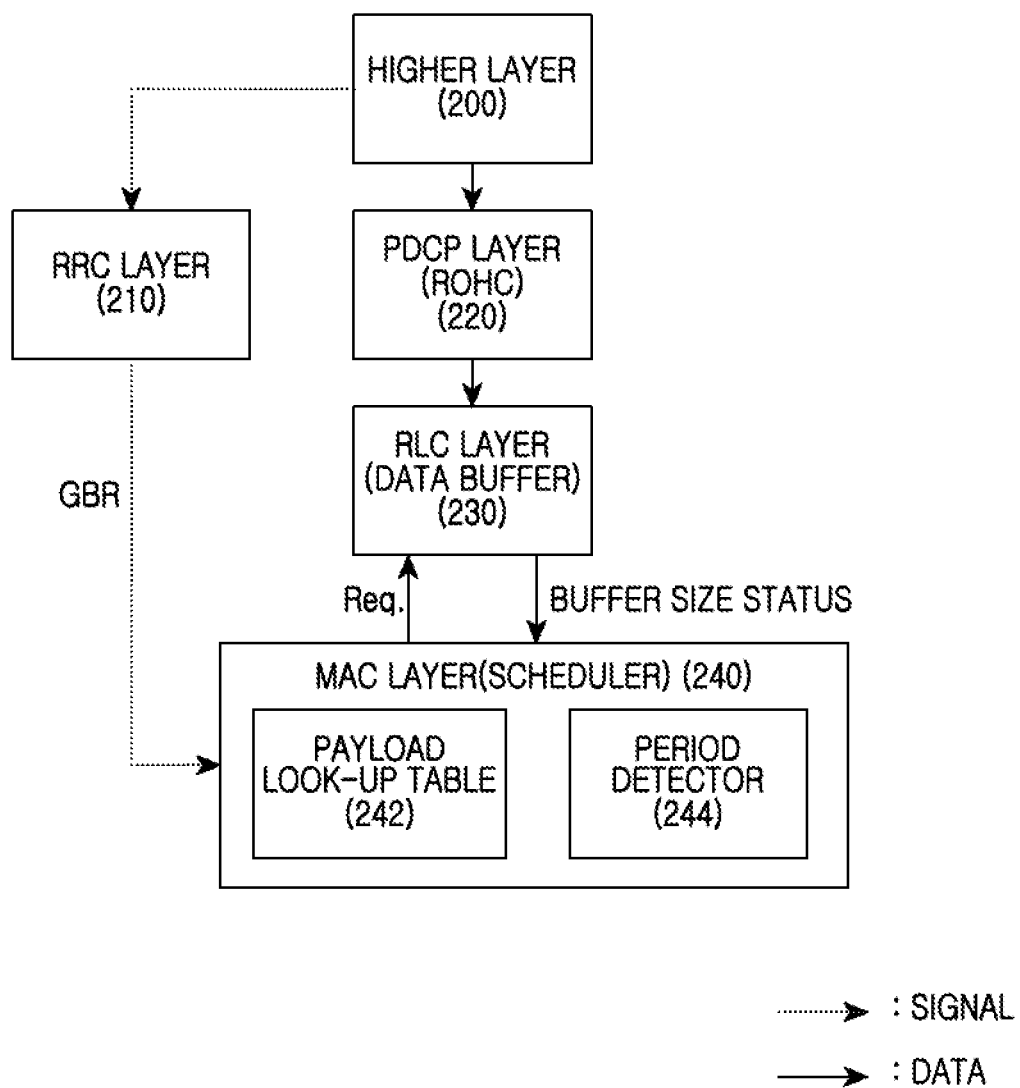
FIG. 2 is a block diagram illustrating a structure of a system according to an exemplary embodiment of the present invention.

FIG. 2 is a block diagram illustrating a structure of a system according to an exemplary embodiment of the present invention.

Referring to FIG. 2, the system includes a higher layer 200, a Radio Resource Control (RRC) layer 210, a Packet Data Convergence Protocol (PDCP) layer 220, a Radio Link Control (RLC) layer 230, and a scheduler of a Media Access Control (MAC) layer (hereinafter, referred to as a MAC scheduler) 240. The MAC scheduler 240 includes a payload look-up table 242 and a period detector 244. In the following description, the system will be considered as part of a base station. However, it is to be understood that this is merely for sake of convenience and not intended to be limiting as the system may be part of another structure.

The RRC layer 210 determines a Guaranteed Bit Rate (GBR) for a VoIP service on the basis of information provided from the higher layer 200, and provides the GBR to the MAC scheduler 240. The PDCP layer 220 compresses a header by applying a RObust Header Compression (ROHC) algorithm to user data provided from higher layer 200, and provides the header to a data buffer of the RLC layer 230. The RLC layer 230 provides a size of the current data buffer to the MAC scheduler 240 upon receiving a request of the buffer size from the MAC scheduler 240. Herein, the GBR may indicate a network complexity, a channel environment, etc.

The MAC scheduler 240 includes the payload look-up table 242 and the period detector 244 to detect a talk spurts period and a silent period of a VoIP session and to allocate or release a resource according to the detected period. That is, the MAC scheduler 240 determines an Adaptive Multi-Rate (AMR) codec rate on the basis of the GBR received from the RRC layer 210, and obtains a threshold and a period detection scheme corresponding to the AMR codec rate from the payload look-up table 242. In addition, the MAC scheduler 240 sends the buffer size request to the RLC layer 230 every scheduling time, i.e., every Transmission Time Interval (TTI), and obtains size information of the data buffer. The MAC scheduler 240 obtains a size of a new packet and an interval between the previous packet and the new packet according to a change in the size of the data buffer, and determines whether a current period is the talk spurts period or the silent period by using at least one of the packet size obtained by the period detector 244, the interval between the previous packet and the new packet, the period detection scheme, and the threshold. Herein, if the buffer size of the current TTI is greater than a value obtained by subtracting a size of a previously transmitted packet from a buffer size of the previous TTI, it may be determined that a new packet arrives. The new packet size may be obtained by a difference between the buffer size of the current TTI and the value obtained by subtracting the size of the previously transmitted packet from the buffer size of the previous TTI.

The payload look-up table 242 indicates a period detection scheme based on a payload size of a voice packet per AMR codec rate and a payload size of a Silence InDication (SID) packet and a threshold time or a threshold size based on the AMR codec rate when applying the ROHC algorithm. Herein, the payload size of the voice packet per AMR codec rate and the payload size of the SID packet are determined according to a size of a VoIP frame and a size of a header to which the ROHC algorithm is applied. In this case, the payload look-up table 242 may be configured as illustrated in FIG. 3 for example.

FIG. 3 illustrates a table for selecting a talk spurts period/silent period detection scheme according to an exemplary embodiment of the present invention.

Referring to the payload look-up table of FIG. 3, the period detection scheme is determined according to a maximum payload size 301 of the SID packet and a minimum payload size 303 of the voice packet per AMR codec rate. That is, the payload look-up table indicates that a detection scheme based on a packet size is selected if a minimum payload size of a voice packet for a specific AMR codec rate is greater than a maximum payload size of an SID packet, and indicates that a detection scheme based on an inter-packet interval is selected if the minimum payload size of the voice packet for the specific AMR codec rate is less than or equal to the maximum payload size of the SID packet. In addition, the payload look-up table indicates a threshold time or a threshold size for detecting a talk spurts period and a silent period according to the period detection scheme at the specific AMR codec rate. Although it is described in FIG. 3 that AMR codec rates to which the detection scheme based on the inter-packet interval is applied use the same threshold time and AMR codec rates to which the detection scheme based on the packet size is applied use different threshold sizes, the other way around is also possible. Of course, in this case, the threshold size has to be greater than the maximum payload size of the SID packet, and may be set to the minimum payload size of the voice packet at the specific AMR codec rate as illustrated in FIG. 3. In addition, the threshold time may be set to a value greater than an interval between voice packets in the talk spurts period and less than an interval between SID packets in the silent period. For example, the threshold time may be set to a value greater than 20 ms and less than 160 ms.

The period detector 244 determines whether a current period is the talk spurts period or the silent period on the basis of a size of a new packet obtained by using a data buffer size that changes every TTI and an interval between the previous packet and the new packet according to a threshold and a period detection scheme based on an AMR codec rate. For example, as illustrated in FIG. 3, since the detection scheme based on the packet size is selected when a current AMR codec rate is 7.40 kilobits per second (kbps), the period detector 244 may compare a size of the new packet with a threshold size, i.e., 184 bits, and determine that the current period is the talk spurts period if the new packet size is greater than or equal to 184 bits, and determine that the current period is the silent period if the new packet size is less than 184 bits. In addition, since the detection scheme based on the inter-packet interval is selected if the current AMR codec rate is 5.90 kbps, the period detector 244 may compare the interval between the previous packet and the new packet with a threshold interval, i.e., 90 ms, and determine that the current period is the talk spurts period if the inter-packet interval is less than 90 ms, and determine that the current period is the silent period if the inter-packet interval is greater than or equal to 90 ms.

Figure 4:
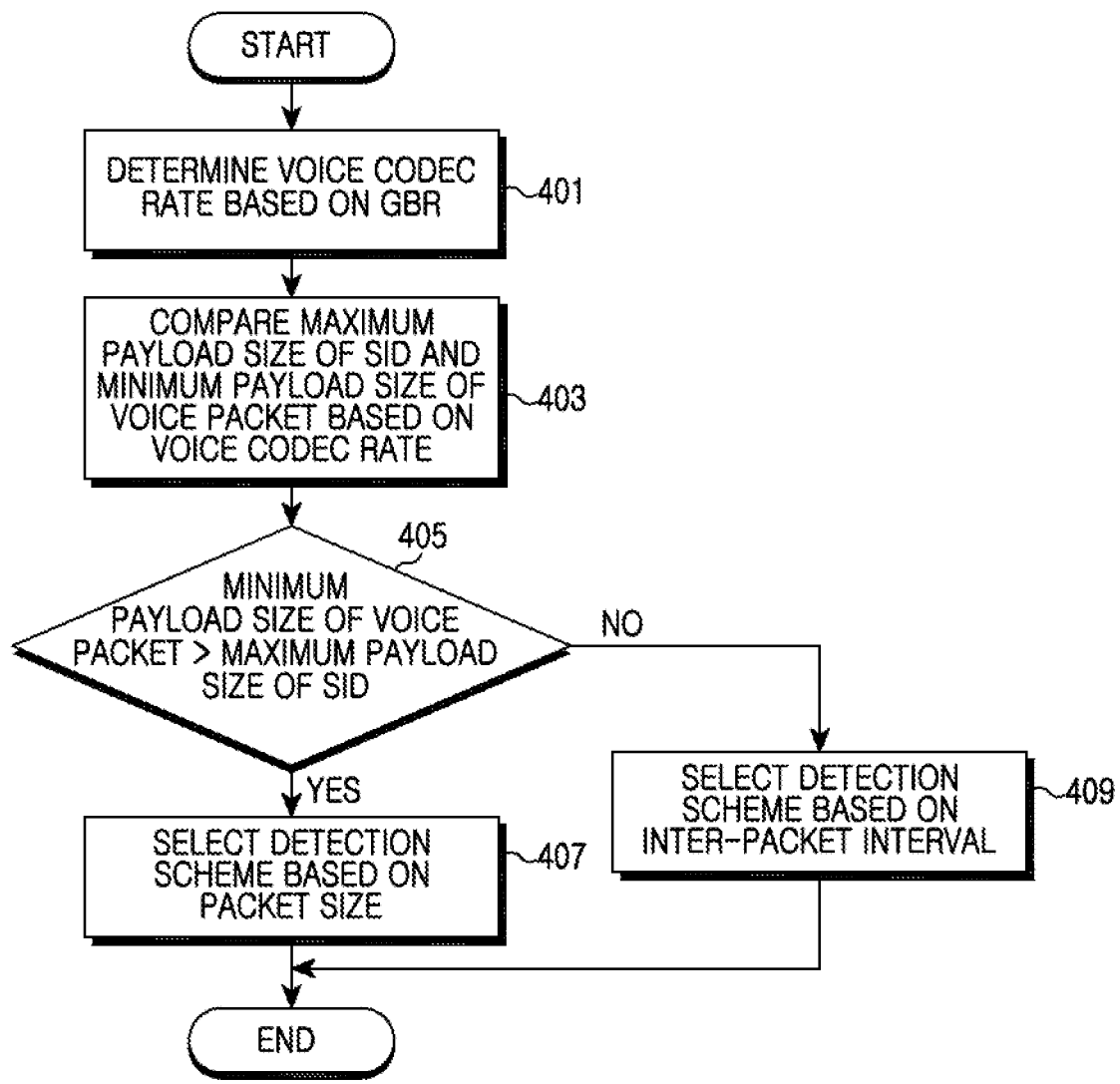
FIG. 4 is a flowchart illustrating a process of selecting a talk spurts period/silent period detection scheme in a system according to an exemplary embodiment of the present invention.

FIG. 4 is a flowchart illustrating a process of selecting a talk spurts period/silent period detection scheme in a system according to an exemplary embodiment of the present invention.

Referring to FIG. 4, the system determines a voice codec rate corresponding to a GBR in step 401. In step 403, the system compares a maximum payload size of an SID and a minimum payload size of a voice packet corresponding to the voice codec rate.

In step 405, the system determines whether the comparison result shows that the minimum payload size of the voice packet corresponding to the voice codec rate is greater than the minimum payload size of the SID.

If it is determined in step 405 that the minimum payload size of the voice packet corresponding to the voice codec rate is greater than the minimum payload size of the SID, the system selects a detection scheme based on a packet size in step 407. Otherwise, if it is determined in step 405 that the minimum payload size of the voice packet corresponding to the voice codec rate is less than or equal to the minimum payload size of the SID, the system selects a detection scheme based on an inter-packet interval in step 409.

Thereafter, the procedure of FIG. 4 ends.

Figure 5:
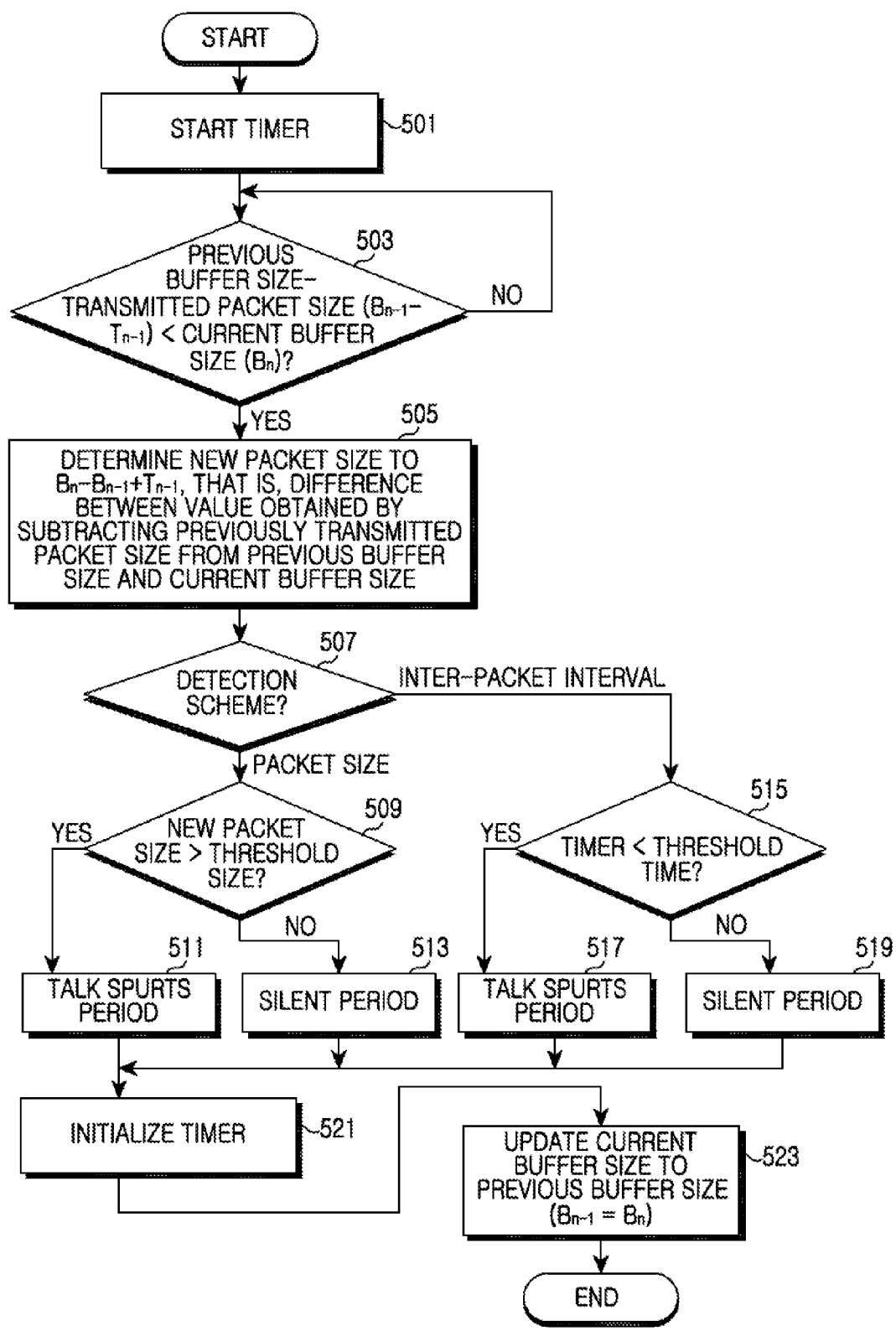
FIG. 5 is a flowchart illustrating a process of detecting a talk spurts period and a silent period by using a period detection scheme in a system according to an exemplary embodiment of the present invention.

FIG. 5 is a flowchart illustrating a process of detecting a talk spurts period and a silent period by using a period detection scheme in a system according to an exemplary embodiment of the present invention. The process of FIG. 5 is repetitively performed every TTI in the system.

Referring to FIG. 5, the system starts a timer in step 501. In step 503, the system determines whether a value obtained by subtracting a previously transmitted packet size $T_{n-1}$ from a previous buffer size $B_{n-1}$ is less than a current buffer size $B_n$.

If it is determined in step 503 that the value obtained by subtracting the previously transmitted packet size $T_{n-1}$ from the previous buffer size $B_{n-1}$ is less than the current buffer size $B_n$. (i.e., $B_{n-1}-T_{n-1}<B_n$), the system detects arrival of a new packet, and proceeding to step 505, determines a new packet size to $B_n-B_{n-1}+T_{n-1}$, that is, a difference between the current buffer size and the value obtained by subtracting the previously transmitted packet size from the previous buffer size. Herein, the system stops an operation of the timer at a time of detecting the arrival of the new packet. This is to measure a time interval between the previous packet and the new packet.

In step 507, the system determines a period detection scheme corresponding to an AMR codec rate. Herein, an exemplary period detection scheme is determined as illustrated in FIG. 4.

If it is determined in step 507 that the period detection scheme is based on the packet size, the system compares a threshold size predetermined based on the AMR codec rate and the new packet size in step 509. If it is determined in step 509 that the new packet size is greater than the threshold size, the system may determine that the current period is the talk spurts period in step 511. Otherwise, if it is determined in step 509 that the new packet size is less than or equal to the threshold size, the system may determine that the current period is the silent period in step 513. For example, if the current AMR codec rate is 7.95 kbps as illustrated in FIG. 3, the detection scheme based on the packet size is selected and the threshold size is 195 bits. Therefore, if the new packet size is greater than 195 bits, the system may determine that the current period is the talk spurts period, and if the new packet size is less than or equal to 195 bits, may determine that the current period is the silent period.

On the other hand, if it is determined in step 507 that the period detection scheme is based on the inter-packet interval, the system compares a threshold time predetermined based on the AMR codec rate and a time value of the timer in step 515. Herein, the time value of the timer indicates a time after the previous packet arrives and before the new packet arrives, i.e., a time interval between the previous packet and the new packet. If it is determined in step 515 that the time value of the timer is less than the threshold time, the system determines that the current period is the talk spurts period in step 517. Otherwise, if it is determined in step 515 that the time value of the timer is greater than or equal to the threshold time, determines that the current period is the silent period in step 519. For example, if the current AMR codec rate is 4.75 kbps as illustrated in FIG. 3, the detection scheme based on inter-packet interval is selected and the threshold time is 90 ms. Therefore, if the time value of the timer is less than 90 ms, the system may determine that the current period is the talk spurts period, and if the time value of the timer is greater than or equal to 90 ms, may determine that the current period is the silent period.

In step 521, the system initializes the timer. In step 523, the system updates the current buffer size to the previous buffer size.

Thereafter, the procedure of FIG. 5 ends.

According to exemplary embodiments of the present invention, a talk spurts period and a silent period are detected based on a packet size or an inter-packet interval by using a minimum size of a voice packet corresponding to a voice codec rate and a maximum size of an SID packet. Therefore, there are advantages in that resources may be effectively allocated or released by minimizing an error in period detection, call quality can be increased by minimizing a packet delay, and VoIP user capacity can be increased.

While the invention has been shown and described with reference to exemplary embodiments thereof, it will be understood by those skilled in the art that various changes in form and details may be made therein without departing from the spirit and scope of the invention as defined by the appended claims and their equivalents.

What is claimed is:

1. A method of detecting a voice period of a base station in a mobile communication system, the method comprising:
   determining a voice codec rate;
   comparing a maximum size of a Silence InDication (SID) packet and a minimum size of a voice packet corresponding to the determined voice codec rate;
   selecting a period detection scheme according to the comparison result using a payload look-up table that includes detection schemes based on a packet size and based on an inter-packet interval; and
   detecting, by a scheduler, the voice period using the selected period detection scheme.

2. The method of claim 1, wherein the detecting of the voice period according to the comparison result comprises:
   detecting the voice period by using the packet size if a maximum payload size of the SID packet is less than or equal to a minimum payload size of the voice packet corresponding to the voice codec rate; and
   detecting the voice period by using the inter-packet interval if the maximum payload size of the SID packet is greater than the minimum payload size of the voice packet corresponding to the voice codec rate.

3. The method of claim 2, wherein the detecting of the voice period by using the packet size comprises:
   determining a size of a new packet by using a change in a size of a data buffer;
   comparing the new packet size and a threshold size predetermined based on the voice codec rate; and
   determining a current period as one of a talk spurts period and a silent period according to the comparison result.

4. The method of claim 3, wherein the determining of the current period as one of the talk spurts period and the silent period according to the comparison result comprises:
   determining the current period as the talk spurts period if the threshold size is less than the new packet size; and
   determining the current period as the silent period if the threshold size is greater than or equal to the new packet size.

5. The method of claim 2, wherein the determining of the voice period by using the inter-packet interval comprises:
   determining a time interval between a previous packet and a new packet by using a change in a size of a data buffer;
   comparing the time interval and a threshold interval predetermined based on the voice codec rate; and
   determining a current period as one of a talk spurts period and a silent period according to the comparison result.

6. The method of claim 5, wherein the determining of the current period as one of the talk spurts period and the silent period according to the comparison result comprises:
   determining the current period as the talk spurts period if the time interval is less than the threshold interval; and
   determining the current period as the silent period if the time interval is greater than or equal to the threshold interval.

7. The method of claim 1, wherein the voice codec rate is determined according to a guaranteed bit rate.

8. The method of claim 1, wherein the maximum payload size of the SID packet and the minimum payload size of the voice packet corresponding to the voice codec rate are determined by using at least one of a size of a header to which a header compression algorithm is applied and a size of a Voice over Internet Protocol (VoIP) frame.

9. A base station apparatus for detecting a voice period in a mobile communication system, the apparatus comprising
   a scheduler configured to determine a voice codec rate, to compare a maximum size of a Silence InDication (SID) packet and a minimum size of a voice packet corresponding to the determined voice codec rate, to select a period detection scheme according to the comparison result using a payload look up table that includes detection schemes based on a packet size or based on an inter-packet interval and to detect, by the scheduler, the voice period using the selected period detection scheme.

10. The apparatus of claim 9, wherein the scheduler is configured to detect the voice period by using the packet size if a maximum payload size of the SID packet is less than or equal to a minimum payload size of the voice packet corresponding to the voice codec rate, and to detect the voice period by using the inter-packet interval if the maximum payload size of the SID packet is greater than the minimum payload size of the voice packet corresponding to the voice codec rate.

11. The apparatus of claim 10, wherein the scheduler is configured to determine a size of a new packet by using a change in a size of a data buffer, to compare the new packet size and a threshold size predetermined based on the voice codec rate, and to determine a current period as one of a talk spurts period and a silent period according to the comparison result.

12. The apparatus of claim 11, wherein the scheduler is configured to determine the current period as one of the talk spurts period and the silent period according to the comparison result by determining the current period as the talk spurts period if the threshold size is less than the new packet size and by determining the current period as the silent period if the threshold size is greater than or equal to the new packet size.

13. The apparatus of claim 10, wherein the scheduler is configured to determine a time interval between a previous packet and a new packet by using a change in a size of a data buffer, to compare the time interval and a threshold interval predetermined based on the voice codec rate, and to determine a current period as one of a talk spurts period and a silent period according to the comparison result.

14. The apparatus of claim 13, wherein the scheduler is configured to determine the current period as one of the talk spurts period and the silent period according to the comparison result by determining the current period as the talk spurts period if the time interval is less than the threshold interval and by determining the current period as the silent period if the time interval is greater than or equal to the threshold interval.

15. The apparatus of claim 9, wherein the scheduler is configured to determine the voice codec rate according to a guaranteed bit rate.

16. The apparatus of claim 9, wherein the maximum payload size of the SID packet and the minimum payload size of the voice packet corresponding to the voice codec rate are determined by using at least one of a size of a header to which a header compression algorithm is applied and a size of a Voice over Internet Protocol (VoIP) frame.

* * * * *